(No Model.)
H. C. CHILES.
ANIMAL SHEARS.
No. 281,454. Patented July 17, 1883.
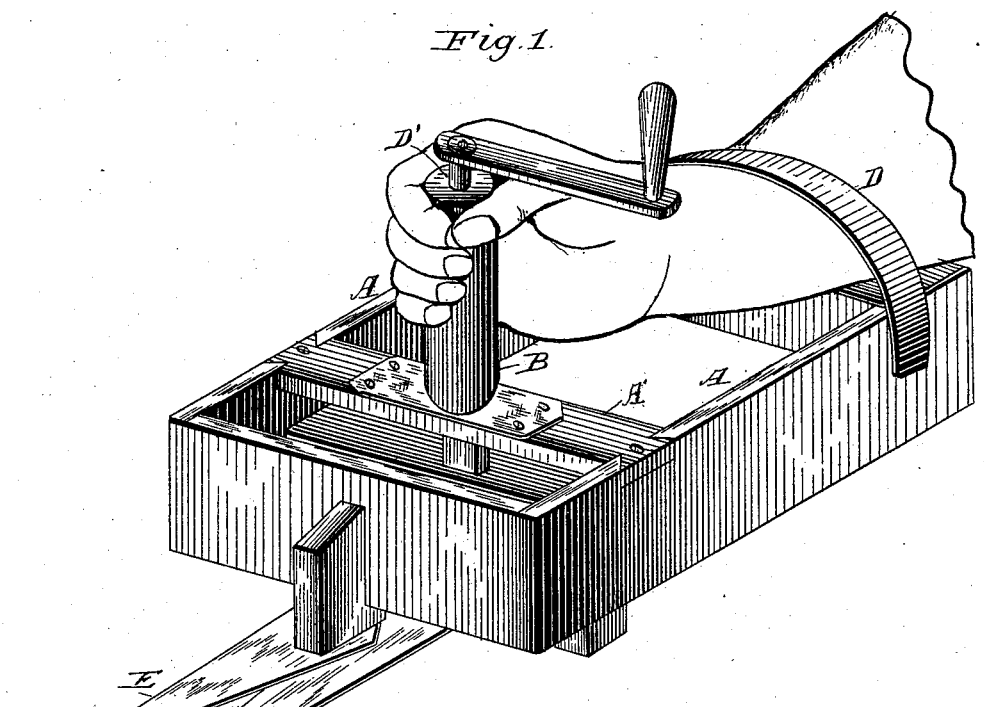
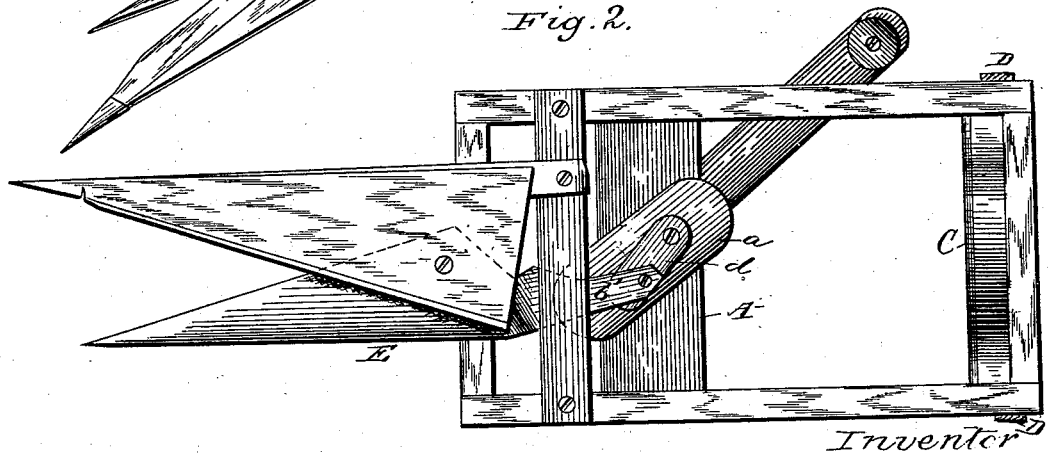
Witnesses:
C. M. Johnson
L. C. Hills
Inventor
Hiram C. Chiles
Attorney

UNITED STATES PATENT OFFICE.

HIRAM C. CHILES, OF ROGERS, ARKANSAS.

ANIMAL-SHEARS.

SPECIFICATION forming part of Letters Patent No. 281,454, dated July 17, 1883.

Application filed May 17, 1883. (No model.)

*To all whom it may concern:*

Be it known that I, HIRAM C. CHILES, a citizen of the United States of America, residing at Rogers, in the county of Benton and State of Arkansas, have invented certain new and useful Improvements in Animal-Shears; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in animal-shears; and it has for its object to provide a device which will be held securely upon the arm of the operator and guided by said arm, while the other hand is free to operate the shears; and it consists in providing a suitable light frame with means whereby it can be attached above the wrist-joint of the operator's hand, while said hand grasps the upright projection through which passes the means for communicating motion to the shears, which motion is transmitted, through the vertical standard which the operator grasps, by means of a crank which is connected to a vertical shaft passing through said standard, and connected to a cam provided with an arm which is connected to one of the blades of the pivoted shears, as will be hereinafter more fully described, and pointed out in the claim.

In the annexed drawings, which illustrate my invention, Figure 1 is a perspective view, showing the same grasped by the operator. Fig. 2 is a plan view.

A represents a suitable light metallic frame, which is provided, at a portion slightly to the front of the same, with a vertical hollow standard, B, and at its rear portion with a concave end, C, and a securing-strap, D, which is adapted to be passed over the arm of the operator, slightly above the wrist-joint. This vertical standard B is secured to a suitable transverse bar, A', under which is located another transverse bar, A². To the vertical shaft D', which passes through the standard or grasping device B, is attached, under the transverse bar A², a suitably-constructed cam, a, which is provided with a link or arm, d, which is connected to one of the blades of the shears, the other blade being rigidly secured to the frame by any suitable means, preferably as shown. This rigid blade is provided at its end with a point-protector, as is usual in this class of animal-shears. The movable blade E, which is pivoted to the stationary blade, is provided with an extended portion, b', which is connected to the link d. The upper part of the connecting-shaft B is provided with a suitable operating-crank, as shown.

In operating this invention the hollow vertical handle, which is secured to the transverse bar A' of the frame A, is grasped with the right hand of the operator, and the rear portion of the frame is secured to his arm by a strap, D, which extends over the same at a point slightly above the wrist. When the implement is thus secured in position, it may be readily guided over the body of the animal, and it is manipulated by the other hand of the operator, which turns the crank attached to the shaft D', which shaft, when turned, transmits the motion through the cam and connecting-link d, thus causing the knife to reciprocate.

I am aware that prior to my invention animal-shears have been provided with crank-shafts for operating the blades, and mechanism for imparting motion from the said crank-shafts, and I do not claim the same, broadly, as my invention; also, that shears have been provided at their end with metallic bands in which the forearm of the operator may rest.

Having thus described my invention, what I claim as new, and desire to secure by Letters Patent, is—

In a shearing device, the frame A, provided with transverse bars A' and A², and concave end C, having attached thereto a rigid blade, vertical hollow standard or handle B, through which passes the operating-shaft carrying at its lower end a cam, a, connecting-link d, attached to the end of the operating-blade E, and an operating-handle attached above the handle B, and strap D, for securing the same upon the operator's arm, the parts being organized and combined substantially as shown, and for the purpose set forth.

In testimony whereof I affix my signature in presence of two witnesses.

HIRAM C. CHILES.

Witnesses:
A. J. ALLEN,
A. C. CLARKE.